United States Patent
Kanehiro et al.

(10) Patent No.: US 10,344,216 B2
(45) Date of Patent: Jul. 9, 2019

(54) LIQUID CRYSTAL DISPLAY DEVICE AND METHOD FOR MANUFACTURING LIQUID CRYSTAL DISPLAY DEVICE

(71) Applicant: Merck Patent GmbH, Darmstadt (DE)

(72) Inventors: Masayuki Kanehiro, Osaka (JP); Masanobu Mizusaki, Osaka (JP)

(73) Assignee: MERCK PATENT GMBH, Darmstadt (DE)

( * ) Notice: Subject to any disclaimer, the term of this patent is extended or adjusted under 35 U.S.C. 154(b) by 312 days.

(21) Appl. No.: 14/382,853

(22) PCT Filed: Feb. 26, 2013

(86) PCT No.: PCT/JP2013/054896
§ 371 (c)(1),
(2) Date: Sep. 4, 2014

(87) PCT Pub. No.: WO2013/133082
PCT Pub. Date: Sep. 12, 2013

(65) Prior Publication Data
US 2015/0085236 A1    Mar. 26, 2015

(30) Foreign Application Priority Data
Mar. 5, 2012  (JP) .................................. 2012-048407

(51) Int. Cl.
  *G02F 1/1337*  (2006.01)
  *C09K 19/56*  (2006.01)
  *G02F 1/137*  (2006.01)

(52) U.S. Cl.
  CPC .............. *C09K 19/56* (2013.01); *G02F 1/137* (2013.01); *G02F 1/133719* (2013.01);
  (Continued)

(58) Field of Classification Search
  CPC .............. C09K 19/56; G02F 1/133719; G02F 1/133788; G02F 1/137; G02F 2001/13712; Y10T 428/1005
  See application file for complete search history.

(56) References Cited

U.S. PATENT DOCUMENTS

2004/0246423 A1* 12/2004 Sasabayashi ..... G02F 1/133707
  349/130
2005/0136196 A1* 6/2005 Kataoka .................. C09K 19/32
  428/1.1
(Continued)

FOREIGN PATENT DOCUMENTS

JP        09227454 A  *  9/1997
JP    2005-181582 A     7/2005
(Continued)

OTHER PUBLICATIONS

Benzil Dimethyl Ketal supplier distributor-CAS 24650-42-8, Parchem fine & specialty chemicals, 2016.*
(Continued)

*Primary Examiner* — Sophie Hon
(74) *Attorney, Agent, or Firm* — Keating and Bennett, LLP (57) ABSTRACT

The present invention provides a liquid crystal display device that is less prone to display defects and a decrease in the voltage holding ratio regardless of the presence or absence of an alignment film. The liquid crystal display device includes: a pair of substrates; a liquid crystal layer containing a liquid crystal material between the substrates; and a polymer layer for controlling alignment of liquid crystal molecules on a surface of at least one of the substrates, the substrates being substantially free of an alignment film in outermost surfaces thereof, the polymer layer being formed by polymerization of at least two kinds of radical polymerizable monomers in the liquid crystal layer, at least one of the radical polymerizable monomers being a compound having a structure that creates a ketyl radical as a result of hydrogen abstraction induced by light radiation.

6 Claims, 5 Drawing Sheets

(52) U.S. Cl.
CPC .......... *G02F 1/133788* (2013.01); *G02F 2001/13712* (2013.01); *Y10T 428/1005* (2015.01)

(56) References Cited

U.S. PATENT DOCUMENTS

| | | | |
|---|---|---|---|
| 2006/0209240 A1 | 9/2006 | Kataoka | |
| 2007/0126966 A1* | 6/2007 | Takahashi | C08J 5/18 349/130 |
| 2011/0135850 A1* | 6/2011 | Saha | C08F 220/30 428/1.23 |
| 2011/0310319 A1* | 12/2011 | Mizusaki | G02B 5/3083 349/33 |
| 2011/0318595 A1* | 12/2011 | Breiner | C09D 4/00 428/522 |
| 2013/0169916 A1 | 7/2013 | Mizusaki et al. | |
| 2013/0342791 A1* | 12/2013 | Mizusaki | C09K 19/14 349/86 |

FOREIGN PATENT DOCUMENTS

| | | |
|---|---|---|
| JP | 2006-145992 A | 6/2006 |
| WO | 2012/032857 A1 | 3/2012 |

OTHER PUBLICATIONS

Hakoi et al.; "Liquid Crystal Display Device and Method for Manufacturing Liquid Crystal Display Device"; U.S. Appl. No. 14/232,010, filed Jan. 10, 2014.
Official Communication issued in International Patent Application No. PCT/JP2013/054896, dated May 28, 2013.

\* cited by examiner

LIQUID CRYSTAL DISPLAY DEVICE AND METHOD FOR MANUFACTURING LIQUID CRYSTAL DISPLAY DEVICE

TECHNICAL FIELD

The present invention relates to a liquid crystal display device and a method for producing a liquid crystal display device. More specifically, the present invention relates to a liquid crystal display device including, as a means for controlling the alignment of liquid crystal molecules instead of conventional alignment films, a polymer layer (hereinafter, also referred to as polymer sustained alignment (PSA) layer) which is formed by polymerization of monomers in a liquid crystal composition, and a method for producing a liquid crystal display device suitable for the formation of such a polymer layer.

BACKGROUND ART

Liquid crystal display devices are very popular display devices used in applications such as televisions, personal computers, and PDAs because of their light and thin designs and low electrical power consumption. As apparent in particular from liquid crystal displays for televisions, a recent trend of liquid crystal displays is the rapidly increasing size. For larger-scale devices, the multi-domain vertical alignment (MVA) mode is suitable because devices of this mode can be produced with high yield and have a wide viewing angle regardless of how large the size is. The multi-domain vertical alignment mode aligns liquid crystal molecules vertically to a substrate surface while no voltage is applied, and provides a higher contrast ratio than the conventional twisted nematic (TN) mode.

In the case of the MVA mode, it is not alignment films but projections (ribs) made of an insulating material that control the tilt angle of liquid crystal molecules. Accordingly, this mode eliminates the need of an alignment treatment for alignment films and therefore eliminates the need of post-treatment such as washing because of the absence of static electricity and dust which may arise by rubbing or the like. Additionally, the variations in the initial angle of liquid crystal molecules are small, and this mode is effective in terms of simple production, improvement of yield, and reduction of costs.

Although the MVA mode does not require any alignment treatment, a base film corresponding to an alignment film is still necessary. Such a base film may have negative impact on the alignment of liquid crystal molecules when it has an uneven thickness or contains unnecessary matter therein, and another disadvantage is that additional processes and equipment costs for producing a base film are required. Considering these disadvantages, a mode that can eliminate such a base film as well is more preferable.

In recent years, this preference has directed interest towards a technique to make a pretilt angle which involves sealing a liquid crystal composition containing polymerizable components such as monomers or oligomers (hereinafter, referred to as monomers or the like) between substrates, and forming a polymer layer by polymerization of the monomers or the like while liquid crystal molecules are tilted with a voltage applied between substrates (e.g. Patent Literatures 1 and 2). Such a polymer layer aligns liquid crystal at certain pretilt angles even when no voltage is applied, and namely can maintain the orientation of the liquid crystal molecules without alignment films. The polymerization of monomers or the like can be accomplished by heat or light (e.g. ultraviolet) radiation.

CITATION LIST

Patent Literature

Patent Literature 1: JP 2005-181582 A
Patent Literature 2: JP 2006-145992 A

SUMMARY OF INVENTION

Technical Problem

Studies by the present inventors have revealed that even when such a polymer layer is formed by the processes of injecting a liquid crystal composition containing a liquid crystal material, monomers, a polymerization initiator, and the like between substrates, and carrying out polymerization under certain conditions, good display quality may not be achieved depending on the materials and production conditions used. Specifically, if a monomer represented by the following formula (5) of Patent Literature 1:

[Chem. 1]

(5)

(wherein X is acrylate or methacrylate;
R is C1 to C18 alkyl or alkoxy;
c is an integer of 0 to 2; and
d is 0 or 1,)
is used to form a polymer layer, the resulting polymer layer aligns liquid crystal molecules vertically without alignment films. However, when c is 0, the monomer undergoes photo-Fries rearrangement. This less photostable monomer causes a decrease in the voltage holding ratio (VHR). On the other hand, when c is not 0, the monomer does not undergo photo-Fries rearrangement, and therefore requires a polymerization initiator. For example, polymerization initiators represented by the following formulas (6-1) to (6-7) of Patent Literature 2 should be used.

[Chem. 2]

(6-1)

(6-2)

-continued (6-3)

(6-4)

(6-5)

(6-6)

(6-7)

Unfortunately, the use of a compound represented by any of the formulas (6-1) to (6-7) leaves a portion thereof not involved in the initiation of polymerization, and the residual portion in the liquid crystal layer may cause a decrease in the voltage holding ratio (VHR).

The present invention was made against the above-described background, and an object thereof is to provide a liquid crystal display device that is less prone to display defects and a decrease in the voltage holding ratio regardless of the presence or absence of an alignment film.

Solution to Problem

Studies of various monomers by the present inventors to achieve good display quality without alignment films have revealed that, for example, lauryl acrylate represented by the following formula (7):

[Chem. 3]

(7)

tends to cause alignment defects and have negative impact on the display quality because of low interaction with liquid crystal molecules, but in contrast, compounds that sufficiently interact with liquid crystal molecules such as the compound represented by the following formula (8):

[Chem. 4]

(8)

provide a polymer layer that ensures stable alignment by itself without alignment films. However, further studies have revealed that the monomer represented by formula (8) is irradiated with light to self-cleave, and the use of this less photostable monomer of formula (8) alone may cause a decrease in the voltage holding ratio.

As a result of further studies, the present inventors have found that both stable alignment and maintenance of the voltage holding ratio can be achieved by using a liquid crystal composition containing at least two kinds of monomers, at least one of which is a monomer having a structure that creates a ketyl radical as a result of hydrogen abstraction induced by light radiation.

Specifically, the present inventors focused on the fact that a portion of a conventional polymerization initiator is left in a liquid crystal layer due to lack of polymerizable groups, and found that the use of a liquid crystal material containing a hydrogen abstraction photopolymerization initiator to which a polymerizable group is attached produces radicals efficiently in a liquid crystal layer as a result of hydrogen abstraction induced by light radiation thereby to accelerate polymerization, and that the initiator itself is incorporated in a polymer layer to efficiently phase-separate from the liquid crystal layer.

Thus, the present inventors found a way to solve the above problem and completed the present invention.

Specifically, one aspect of the present invention is a liquid crystal display device including a pair of substrates; a liquid crystal layer containing a liquid crystal material between the substrates; and a polymer layer for controlling alignment of liquid crystal molecules on a surface of at least one of the substrates, the substrates being substantially free of an alignment film in outermost surfaces thereof, the polymer layer being formed by polymerization of at least two kinds of radical polymerizable monomers in the liquid crystal layer, at least one of the radical polymerizable monomers being a compound having a structure that creates a ketyl radical as a result of hydrogen abstraction induced by light radiation.

The structure of the liquid crystal display panel is not particularly limited by other members as long as it includes these essential members.

The liquid crystal material may have either positive dielectric constant anisotropy or negative dielectric constant anisotropy. In the case where the liquid crystal material has negative dielectric constant anisotropy, and where the polymer layer is formed such that liquid crystal molecules near the polymer layer are aligned vertically, the liquid crystal device is of the vertical alignment (VA) mode and has a high contrast ratio.

For example, one of the substrates of the liquid crystal display device of the present invention functions as an array substrate, and the other functions as a color filter substrate. The array substrate includes a plurality of pixel electrodes, and controls the alignment of liquid crystal in each pixel. The color filter substrate includes color filters of different colors, which are disposed within each of regions corresponding to the respective pixel electrodes of the array substrate to control which color is displayed in each pixel.

The substrates are substantially free of an alignment film in outermost surfaces thereof. The term "alignment film" herein refers to a film capable of controlling the alignment of liquid crystal molecules, and specifically, a single-layer or multi-layer film made of polyimide, polyamic acid, polyamide, polymaleimide, polysiloxane, polysilsesquioxane, polyphosphazene, or a copolymer thereof or a film formed by oblique deposition of silicon oxide. In a common liquid crystal display device, an alignment film is formed over a substrate that defines a display region by directly applying an alignment film material (e.g. application of polyimide or the like) or by deposition (e.g. oblique deposition of silicon oxide (SiO)). The term "display region" refers to a region in which images recognizable by viewers are displayed, and the region does not include peripheral regions such as terminal portions, for example. The alignment film is not limited only to films subjected to an alignment treatment, and is intended to include films formed by application of a known alignment film material such as polyimide. The term "films subjected to an alignment treatment" is intended to include films subjected to a rubbing treatment or a photoalignment treatment. A vertical alignment film can align liquid crystal molecules vertically to the film surface and a horizontal alignment film can align liquid crystal molecules horizontally to the film surface, for example, even if no alignment treatment is performed thereon. In the case of a mode in which alignment controlling structures are formed, such as the MVA mode and the PVA mode, the tilt angle of liquid crystal molecules can be controlled without the need of an alignment treatment.

At least one of the substrates includes a polymer layer for controlling the alignment of liquid crystal molecules on the surface thereof. The polymer layer is formed by polymerization of at least two kinds of radical polymerizable monomers in the liquid crystal layer. The polymer layer allows liquid crystal molecules near the polymer layer to be aligned at certain initial tilt angles without alignment films. For example, in the case where the polymer layer is formed by polymerization of the monomers while the liquid crystal is pretilted, the polymer layer has a structure that pretilts the liquid crystal molecules.

At least one of the radical polymerizable monomers is a compound having a structure that creates a ketyl radical as a result of hydrogen abstraction induced by light radiation. The use of such a monomer allows the polymerization to complete in a short time without the need of additional polymerization initiator, and leaves no unnecessary matter derived from other polymerization initiators. Accordingly, a decrease in the voltage holding ratio (VHR) of the liquid crystal layer can be prevented, and degradation of the display quality can be less likely to occur. Additionally, only short-term light radiation is enough. This means that the members can be protected from degradation caused by long-term light radiation, and therefore a liquid crystal display device with high reliability can be obtained.

The term "ketyl radical" refers to a radical that is transformed from a carbonyl compound as a result of absorption of hydrogen from a hydrogen donor by photoexcitation of the carbonyl compound.

Examples of such a hydrogen donor include alkyl, alkenyl or aralkyl-containing ethers, amines, thiols and alcohols.

Examples of the compound having a structure that creates a ketyl radical include compounds having a benzophenone structure, a fluorenone structure, a thioxanthone structure, a benzyl structure, or an acetophenone structure in its molecule.

The structure that creates a ketyl radical is preferably a structure that creates a radical in response to irradiation with a 330 nm or longer wavelength component. Irradiation with a wavelength component shorter than 330 nm may degrade members in the panel, and may impair the quality of the display. Therefore, the hydrogen absorption photopolymerization initiator to which a polymerizable group is attached preferably has a structure that efficiently causes hydrogen abstraction and creates a radical in response to irradiation with a 330 nm or longer wavelength component. The structure that creates a ketyl radical is more preferably a structure that creates a radical in response to irradiation with a wavelength component shorter than 400 nm. Since such a structure hardly absorbs light of 400 nm or longer, which corresponds to light emitted from back light units used in displays (cold cathode fluorescent lamps and LEDs) for use under common conditions, a portion of the photopolymerization initiator which is phase-separated by polymerization before absorbing hydrogen will not cause the above reaction while the display is being operated. In practical use, the display can maintain its VHR at a high level. From another point of view, the structure that creates a ketyl radical is more preferably a structure that creates a radical in response to irradiation with a 400 nm or longer wavelength component. Such a wavelength range including up to longer wavelengths increases the light usability, and allows the hydrogen absorption photopolymerization initiator to which a polymerizable group is attached to efficiently cause hydrogen abstraction.

The benzophenone structure, fluorenone structure, thioxanthone structure and benzyl structure, among the structures that create a ketyl radical, absorb light of 330 nm or longer. The fluorenone structure, thioxanthone structure, and benzyl structure absorb light of 400 nm or longer, and start to polymerize in response to irradiation with a longer wavelength component. Thus, these structures do not require irradiation with a shorter wavelength component, and therefore, the above-mentioned degradation can be avoided.

The benzyl structure is known to preferentially undergo hydrogen abstraction to create a ketyl radical in response to light radiation in the presence of a hydrogen donor, and is photo-cleaved to create a radical in the absence of a hydrogen donor.

Examples of the radical polymerizable monomer include those obtainable by attaching a polymerizable group to hydrogen absorption photopolymerization initiators that create a ketyl radical as a result of hydrogen abstraction induced by light radiation, and specifically include those having a structure represented by the following formula (1) that is a hydrogen absorption photopolymerization initiator.

[Chem. 5]

(1)

(In the formula, A1 and A2, which may be the same or different, is a structure having a benzene ring, biphenyl ring, or linear or branched C1 to C12 alkyl or alkenyl; either A1 or A2 includes a benzene ring or phenyl ring;

at least one of A1 and A2 includes -Sp1-P1;

A1 and A2 may include -Sp1-P1, halogen, —CN, —NO$_2$, —NCO, —NCS, —OCN, —SCN, —SF$_5$, or C1 to C12 alkyl or aralkyl substituted for a hydrogen atom, and the alkyl group may be linear or branched; two adjacent hydrogen atoms of A1 and A2 may be substituted with C1 to C12 linear or branched alkylene or alkenylene to form a ring structure;

the alkyl, alkenyl, alkylene, alkenylene, or aralkyl group of A1 and A2 may have -Sp1-P1 substituted for a hydrogen atom; the alkyl, alkenyl, alkylene, alkenylene, or aralkyl of A1 and A2 may have —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— substituted for —CH$_2$—, provided that oxygen, sulfur and nitrogen atoms are not adjacent to each other;

P1 is acryloyloxy, methacryloyloxy, vinyl, vinyloxy, acryloylamino, or methacryloylamino;

Sp1 is C1 to C6 linear, branched or cyclic alkylene or alkyleneoxy, or a direct bond;

m is 1 or 2; and the dotted lines between A1 and Y and between A2 and Y indicate that A1 and A2 may be connected through a bond involving Y; and

Y is —CH$_2$—, —CH$_2$CH$_2$—, —CH═CH—, —O—, —S—, —NH—, —N(CH$_3$)—, —N(C$_2$H$_5$)—, —N(C$_3$H$_7$)—, —N(C$_4$H$_9$)—, —OCH$_2$—, —CH$_2$O—, —SCH$_2$—, —CH$_2$S—, or a direct bond.)

More preferred examples of the compound having a structure that creates a ketyl radical as a result of hydrogen abstraction induced by light radiation include those represented by the following formulas (2-1) to (2-6).

[Chem. 6]

(2-1)

(2-2)

(2-3)

(2-4)

(2-5)

(2-6)

(In the formula, R1 and R2, which may be the same or different, is -Sp1-P1, hydrogen, halogen, —CN, —NO$_2$, —NCO, —NCS, —OCN, —SCN, —SF$_5$, or C1 to C12 alkyl, aralkyl, phenyl, or biphenyl, and the alkyl group may be linear or branched;

at least one of R1 and R2 includes -Sp1-P1;

P1 is acryloyloxy, methacryloyloxy, vinyl, vinyloxy, acryloylamino or methacryloylamino;

Sp1 is C1 to C6 linear, branched or cyclic alkylene or alkyleneoxy, or a direct bond;

when at least one of R1 and R2 is C1 to C12 alkyl, aralkyl, phenyl, or biphenyl, the at least one of R1 and R2 may have fluorine, chlorine, or -Sp1-P1 substituted for a hydrogen atom;

R1 and R2 may have —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— substituted for —CH$_2$—, provided that oxygen, sulfur and nitrogen atoms are not adjacent to each other.)

The compounds having a structure represented by any of the formulas (2-1) to (2-6) absorb light in a wavelength range including up to approximately 380 nm. Therefore, even when a cut filter is used to cut light of shorter wavelength (e.g. light of 330 nm or shorter) that may affect the reliability of the liquid crystal, these compounds can initiate the polymerization.

Other more preferred examples of the compound having a structure that creates a ketyl radical as a result of hydrogen abstraction induced by light radiation include compounds having a structure represented by the following formula (3-1) or (3-2).

[Chem. 7]

(3-1)

-continued (3-2)

(In the formula, R1 and R2, which may be the same or different, is -Sp1-P1, hydrogen, halogen, —CN, —NO$_2$, —NCO, —NCS, —OCN, —SCN, —SF$_5$, or C1 to C12 alkyl, aralkyl, phenyl or biphenyl, and the alkyl group may be linear or branched;
at least one of R1 and R2 includes -Sp1-P1;
P1 is acryloyloxy, methacryloyloxy, vinyl, vinyloxy, acryloylamino or methacryloylamino;
Sp1 is C1 to C6 linear, branched or cyclic alkylene or alkyleneoxy, or a direct bond;
when at least one of R1 and R2 is C1 to C12 alkyl, aralkyl, phenyl, or biphenyl, the at least one of R1 and R2 may have fluorine, chlorine, or -Sp1-P1 substituted for a hydrogen atom; and
R1 and R2 may have —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— substituted for —CH$_2$—, provided that oxygen, sulfur and nitrogen atoms are not adjacent to each other.)

The compounds represented by the formula (3-1) or (3-2) absorb light in a wavelength range including up to approximately 430 nm. Their absorption wavelength range, which is wider than that of the compounds having a structure represented by any of the formulas (2-1) to (2-6), increases the light usability, and enables the polymerization initiated by light radiation to proceed at a faster rate even when light shorter than 330 nm is cut in the production of the liquid crystal display device. As a result, the throughput is improved. Additionally, their wide absorption wavelength range including longer wavelengths allows the polymerization of the radical polymerizable monomers by light radiation to be carried out after a polarizing plate is attached to each of the substrates.

The other radical polymerizable monomer preferably includes at least one radical polymerizable monomer having a ring structure and a monofunctional or polyfunctional polymerizable group.

Examples of such a compound having a ring structure and a monofunctional or polyfunctional polymerizable group include those represented by the following formula (9).

[Chem. 8]

(In the formula, R3 is —R4-Sp3-P3, hydrogen, halogen, —CN, —NO$_2$, —NCO, —NCS, —OCN, —SCN, —SF$_5$, or C1 to C18 linear or branched alkyl;
P3 is acrylate, methacrylate, acrylamide, methacrylamide, vinyl or vinyloxy;
Sp3 is C1 to C6 linear, branched or cyclic alkylene or alkyleneoxy, or a direct bond;
R3 may have fluorine or chlorine substituted for a hydrogen atom;

R3 may have —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, or —OCO—CH═CH— substituted for —CH$_2$—;
R4 is —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, —OCO—CH═CH—, or a direct bond;
A1 and A2, which may be the same or different, are each 1,2-phenylene, 1,3-phenylene, 1,4-phenylene, naphthalene-1,4-diyl, naphthalene-1,5-diyl, naphthalene-2,6-diyl, 1,4-cyclohexylene, 1,4-cyclohexenylene, 1,4-bicyclo[2.2.2]octylene, piperidine-1,4-diyl, decahydronaphthalene-2,6-diyl, 1,2,3,4-tetrahydronaphthalene-2,6-diyl, indan-1,3-diyl, indan-1,5-diyl, indan-2,5-diyl, phenanthrene-1,6-diyl, phenanthrene-1,8-diyl, phenanthrene-2,7-diyl, or phenanthrene-3,6-diyl;
A1 and A2 may have —O— and/or —S— substituted for —CH$_2$—, provided that they are not adjacent to each other;
A1 and A2 may have fluorine, chlorine, —CN, or C1 to C6 alkyl, alkoxy, alkylcarbonyl, alkoxycarbonyl, or alkylcarbonyloxy substituted for a hydrogen atom;
Z is —O—, —S—, —NH—, —CO—, —COO—, —OCO—, —O—COO—, —OCH$_2$—, —CH$_2$O—, —SCH$_2$—, —CH$_2$S—, —N(CH$_3$)—, —N(C$_2$H$_5$)—, —N(C$_3$H$_7$)—, —N(C$_4$H$_9$)—, —CF$_2$O—, —OCF$_2$—, —CF$_2$S—, —SCF$_2$—, —N(CF$_3$)—, —CH$_2$CH$_2$—, —CF$_2$CH$_2$—, —CH$_2$CF$_2$—, —CF$_2$CF$_2$—, —CH═CH—, —CF═CF—, —C≡C—, —CH═CH—COO—, —OCO—CH═CH—, or a direct bond; and
n is 0, 1 or 2.)

More preferred examples of the compound having a ring structure and a monofunctional polymerizable group include those having a structure represented by the following formula (4).

[Chem. 9]

(4)

(In the formula, P2 is acrylate, methacrylate, acrylamide, methacrylamide, vinyl, or vinyloxy; a is 0 or 1; b is 0 or 1; s is a natural number selected from 1 to 18; t is a natural number selected from 1 to 8; and x is a natural number selected from 1 to 3.)

The compounds having a structure represented by the formula (4) are highly photostable, and will not undergo photo-Fries rearrangement when exposed to ultraviolet radiation for forming the polymer layer. Therefore, the use of such a compound as the radical polymerizable monomer can result in a liquid crystal display device that is much less prone to a decrease in the voltage holding ratio.

At least one of the substrates preferably has a silane coupling layer on the outermost surface thereof. When the silane coupling layer is located directly below the polymer layer, the hydrogen absorption efficiency of the hydrogen absorption photopolymerization initiator can be improved. Specifically, the silane coupling layer contains a silane coupling compound having hydrogen atoms in its functional group, and the hydrogen atoms accelerate the polymerization into a polymer initiated by the hydrogen absorption photopolymerization initiator, and thus can shorten the period of ultraviolet radiation necessary for the formation of the polymer layer.

Preferred examples of the silane coupling compound include those having at least one functional group selected from the group consisting of vinyl, epoxy, amino, mathacryl, acryl, mercapto, and isocyanato.

Another aspect of the present invention relates to a method for producing a liquid crystal display device including the steps of: disposing a liquid crystal composition containing a liquid crystal material and at least two kinds of radical polymerizable monomers between a pair of substrates that are substantially free of an alignment film in outermost surfaces thereof; and polymerizing the radical polymerizable monomers by irradiating the liquid crystal composition with light, thereby forming a polymer layer for controlling alignment of liquid crystal molecules on the surface of at least one of the substrates, at least one of the radical polymerizable monomers being a compound having a structure that creates a ketyl radical as a result of hydrogen abstraction induced by the light radiation.

The method for producing a liquid crystal display device of the present invention includes disposing a liquid crystal composition containing a liquid crystal material and at least two kinds of radical polymerizable monomers between a pair of substrates that are substantially free of an alignment film in outermost surfaces thereof. At least one of the radical polymerizable monomers is a compound having a structure that creates a ketyl radical as a result of hydrogen abstraction induced by the light radiation. As the liquid crystal material and the radical polymerizable monomers, those described for the liquid crystal display device of the present invention can be used.

The method for producing a liquid crystal display device of the present invention includes polymerizing the radical polymerizable monomers by irradiating the liquid crystal composition with light, thereby forming a polymer layer for controlling alignment of liquid crystal molecules on the surface of at least one of the substrates. In the method for producing a liquid crystal display device of the present invention, the radical polymerizable monomers having the features described as above are used to form a polymer layer on the surface of at least one of the substrates. This allows the polymerization to compete in a short time without additional polymerization initiator, and leaves no unnecessary matter derived from other polymerization initiators. Accordingly, a decrease in the voltage holding ratio (VHR) of the liquid crystal layer can be prevented, and degradation of the display quality can be less likely to occur. Additionally, only short-term light radiation is enough. This means that the members can be protected from degradation caused by long-term light radiation, and therefore a liquid crystal display device with high reliability can be obtained. Another advantage is that since the production method of the present invention can control the alignment of liquid crystal molecules without alignment films, and can prevent a decrease in the voltage holding ratio, no additional processes and equipment costs for producing an alignment film may be required.

The method for producing a liquid crystal display device of the present invention is not particularly limited by other steps as long as it includes these essential steps.

Similarly to the preferable embodiments of the liquid crystal display device of the present invention, the following embodiments (a) to (l) are mentioned as preferable embodiments of the method for producing a liquid crystal display device of the present invention.

Embodiment (a): The compound having a structure that creates a ketyl radical as a result of hydrogen abstraction induced by light radiation is a compound represented by the formula (1).

Embodiment (b); The compound represented by the formula (1) is a compound represented by any of the formulas (2-1) to (2-6).

Embodiment (c): The compound represented by the formula (1) is a compound represented by formula (3-1) or (3-2).

Embodiment (d): The other radical polymerizable monomer includes at least one radical polymerizable monomer having a ring structure and a monofunctional or polyfunctional polymerizable group.

Embodiment (e): The radical polymerizable monomer having a ring structure and a monofunctional polymerizable group is a compound represented by the formula (9).

Embodiment (f): The compound represented by the formula (9) is a compound represented by the formula (4).

Embodiment (g): The production method further includes, before the step of disposing a liquid crystal composition between the substrates, forming a silane coupling layer on the outermost surface of at least one of the substrates.

Embodiment (h): The silane coupling layer contains a silane coupling compound having at least one functional group selected from the group consisting of vinyl, epoxy, amino, methacryl, acryl, mercapto and isocyanato.

Embodiment (i): The liquid crystal material has negative dielectric constant anisotropy.

Embodiment (j): The step of forming a polymer layer includes using light of 330 nm or longer.

Embodiment (k): The step of forming a polymer layer includes using light shorter than 400 nm.

Embodiment (l): The step of forming a polymer layer includes using light of 400 nm or longer.

In the case where the compound having a structure that creates a ketyl radical as a result of hydrogen abstraction induced by light radiation is a compound represented by the formula (3-1) or (3-2), which absorbs light in a wavelength range including up to approximately 430 nm, the polymer layer may be formed by irradiation of the liquid crystal composition with light after a polarizing plate is attached to each of the substrates.

The step of forming a polymer layer may be carried out while a threshold or higher voltage is applied to the liquid crystal layer. In the case where the light radiation is carried out while a threshold or higher voltage is applied to the liquid crystal layer in the PSA polymerization step, a polymer is produced in the form that fits the alignment of the liquid crystal molecules to which a threshold or higher voltage is applied. Accordingly, the resulting polymer layer has a structure that allows the liquid crystal molecules to be aligned at initial pretilt angles even when no voltage is applied.

The step of forming a polymer layer may be carried out without applying a threshold or higher voltage to the liquid crystal layer. Without applying a threshold or higher voltage, a polymer layer capable of controlling the alignment of liquid crystal molecules can be formed. This case can eliminate the need of steps for applying a voltage.

Advantageous Effects of Invention

Accordingly, the present invention provides a liquid crystal display device that prevents a decrease in the voltage holding ratio (VHR) of the liquid crystal layer, and ensures good display quality. Additionally, the present invention provides a liquid crystal display device that tends to avoid degradation of members caused by long-term light radiation and has high reliability.

DESCRIPTION OF EMBODIMENTS

The following embodiments are offered to illustrate the present invention in more detail using the figures, and are not intended to limit the present invention.

Embodiment 1

The liquid crystal display device of the present invention and liquid crystal display devices produced by the production method of the present invention exhibit good display performance when used for display devices such as televisions, personal computers, mobile phones, and information displays.

Figure 1:
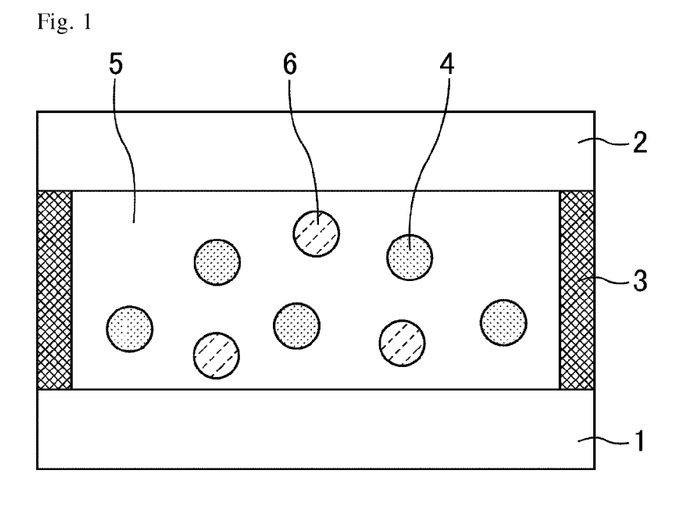
FIG. 1 is a cross-sectional view of a liquid crystal display device of Embodiment 1 before being subjected to a PSA polymerization step.
Figure 2:
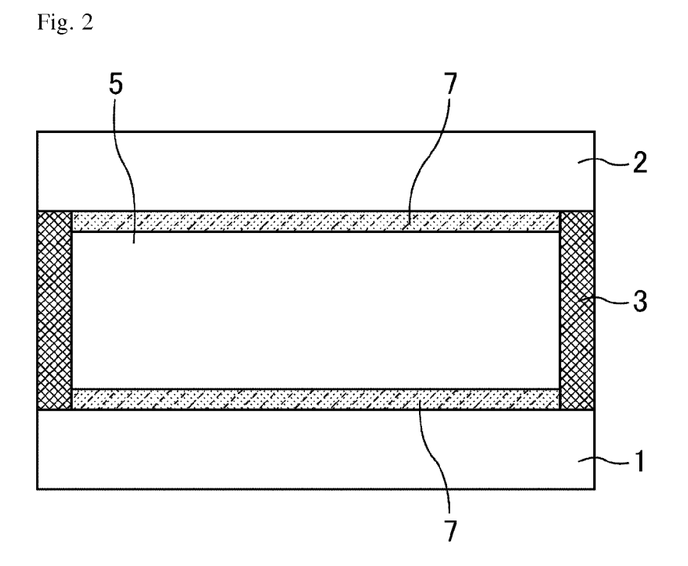
FIG. 2 is a cross-sectional view of the liquid crystal display device of Embodiment 1 having been subjected to the PSA polymerization step.

FIG. 1 and FIG. 2 are cross-sectional views of a liquid crystal display device of Embodiment 1. FIG. 1 shows the device before being subjected to a PSA polymerization step, and FIG. 2 shows the device having been subjected to the PSA polymerization step. As seen in FIG. 1 and FIG. 2, the liquid crystal display device of Embodiment 1 includes an array substrate 1, a color filter substrate 2, and a liquid crystal layer 5 disposed between the two substrates, that is, the array substrate 1 and the color filter substrate 2. The array substrate 1 includes an insulating transparent substrate made of glass or the like, and various lines, pixel electrodes, and thin film transistors (TFTs) are formed on the transparent substrate. The color filter substrate 2 includes an insulating transparent substrate made of glass or the like, and color filters, a black matrix, and a common electrode are formed on the transparent substrate.

The liquid crystal layer 5 contains a liquid crystal material and at least two kinds of radical polymerizable monomers 4, 6. The liquid crystal material may have either positive dielectric constant anisotropy or negative dielectric constant anisotropy. The radical polymerizable monomer 4, among the at least two kinds of radical polymerizable monomers, is a compound having a structure that creates a ketyl radical as a result of hydrogen abstraction induced by light radiation, and the other radical polymerizable monomer 6 is a compound having a ring structure and a monofunctional or polyfunctional polymerizable group.

The light radiation to the liquid crystal layer 5 induces hydrogen abstraction, so that the radical polymerizable monomer 4 creates a ketyl radical. This radical active species initiates and accelerates successive chain polymerization of the radical polymerizable group of the radical polymerizable monomers 4, 6, and the resulting polymer produced by the polymerization phase-separates and precipitates to form PSA layers 7 on the substrates 1, 2, as shown in FIG. 2.

The radical polymerizable monomer 4 used in Embodiment 1 absorbs light and creates a radical to initiate chain polymerization by itself, and therefore, eliminates the need of additional polymerization initiator. Additionally, its polymerizable group allows the polymerization initiator itself to be incorporated into the PSA layer 7 to remarkably reduce the residual amount of the initiator in the liquid crystal layer 5.

In Embodiment 1, for example, in the case where the light radiation is carried out while a threshold or higher voltage is applied to the liquid crystal layer 5 in the PSA polymerization step, a polymer is produced in the form that fits the alignment of the liquid crystal molecules to which a threshold or higher voltage is applied. Accordingly, the resulting polymer layers have a structure that allows the liquid crystal molecules to be aligned at initial pretilt angles even when no voltage is applied. However, even when the PSA polymerization step is carried out without applying a threshold or higher voltage, the use of the at least two kinds of radical polymerizable monomers of Embodiment 1 results in PSA layers that align liquid crystal molecules vertically.

In Embodiment 1, as shown in FIG. 1 and FIG. 2, both the array substrate 1 and the color filter substrate 2 do not have an alignment film in the outermost surfaces thereof, and instead each have the PSA layer 7 in the surface thereof. Between the array substrate 1 and the color filter substrate 2, a sealing material 3 is attached. The sealing material 3 is located along the periphery of the substrates 1, 2 to seal the liquid crystal layer 5 between the array substrate 1 and the color filter substrate 2. Since the light radiation to the liquid crystal layer 5 is carried out after sealing the liquid crystal layer 5 with the sealing material 3, the resulting PSA layers 7 are formed in a region surrounded by the sealing material 3.

In Embodiment 1, the alignment of liquid crystal molecules may be determined by linear slits which are formed in the pixel electrodes of the array substrate 1 or the common electrode of the color filter substrate 2 (this mode is referred to as patterned vertical alignment (PVA) mode). The thin linear slits in the pixel electrodes and/or the common electrode align all liquid crystal molecules towards the linear slits while a voltage is applied. By polymerizing the radical polymerizable monomers 4, 6 while a threshold or higher voltage is applied to the liquid crystal layer 5, PSA layers 7 that align liquid crystal molecules at pretilt angles can be formed.

Embodiment 2

A liquid crystal display device of Embodiment 2 is the same as the liquid crystal display device of Embodiment 1 except that it includes a silane coupling layer on the outermost surfaces of the substrates.

For the silane coupling layer, a silane coupling agent having a structure represented by the following formula (10) is used.

[Chem. 10]

$$(RO)_3Si\text{—}Y \qquad (10)$$

(In the formula, R is methoxy or ethoxy; and
Y is vinyl, epoxy, amino, methacryl, acryl, mercapto or isocyanato.)

Figure 3:
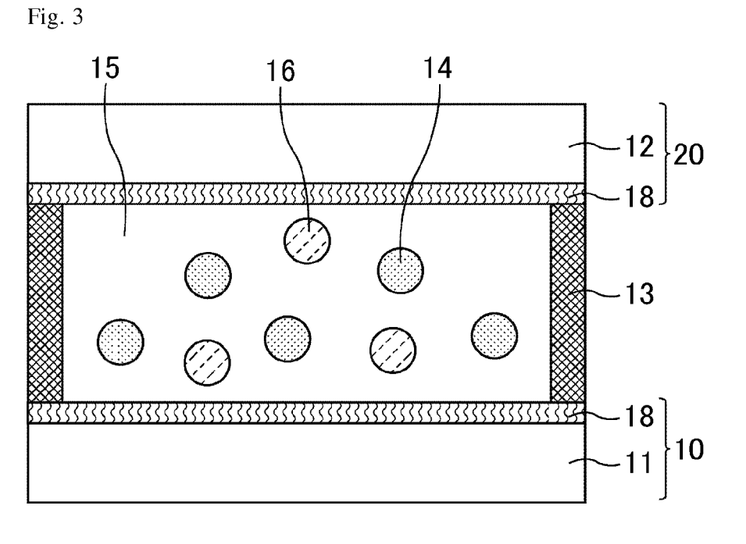
FIG. 3 is a cross-sectional view of a liquid crystal display device of Embodiment 2 before being subjected to a PSA polymerization step.
Figure 4:
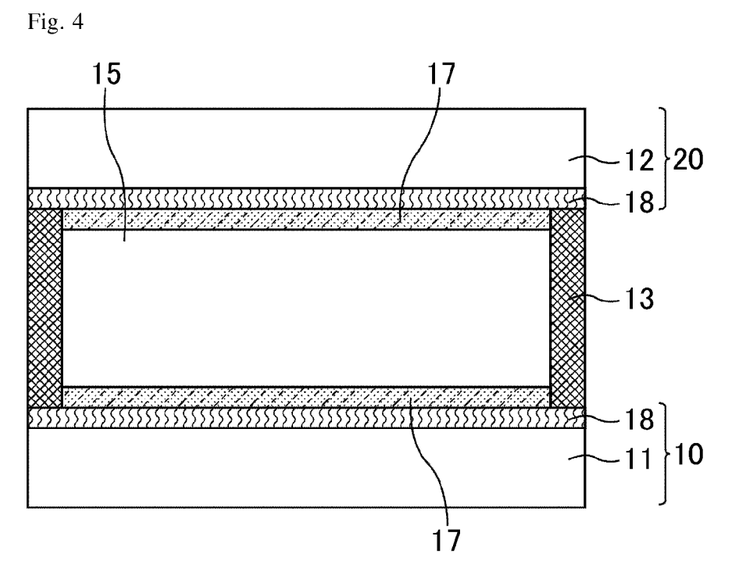
FIG. 4 is a cross-sectional view of the liquid crystal display device of Embodiment 2 having been subjected to the PSA polymerization step.

FIGS. 3 and 4 are cross-sectional views of a liquid crystal display device of Embodiment 2. FIG. 3 shows the device before being subjected to a PSA polymerization step, and FIG. 4 shows the device having been subjected to the PSA polymerization step. As seen in FIGS. 3 and 4, an array substrate 11 and a color filter substrate 12 of the liquid crystal display device of embodiment 2 each include a silane coupling layer 18 on the outermost surface thereof.

Irradiation of the liquid crystal layer 15 with light causes a radical polymerizable monomer 14 to create a ketyl radical. This radical active species initiates and accelerates successive chain polymerization of radical polymerizable groups of the radical polymerizable monomer 14 and the other radical polymerizable monomer 16, and the resulting polymer produced by the polymerization phase-separates and precipitates to form PSA layers 17 on the silane coupling layers 18, as shown in FIG. 4.

Figure 5:
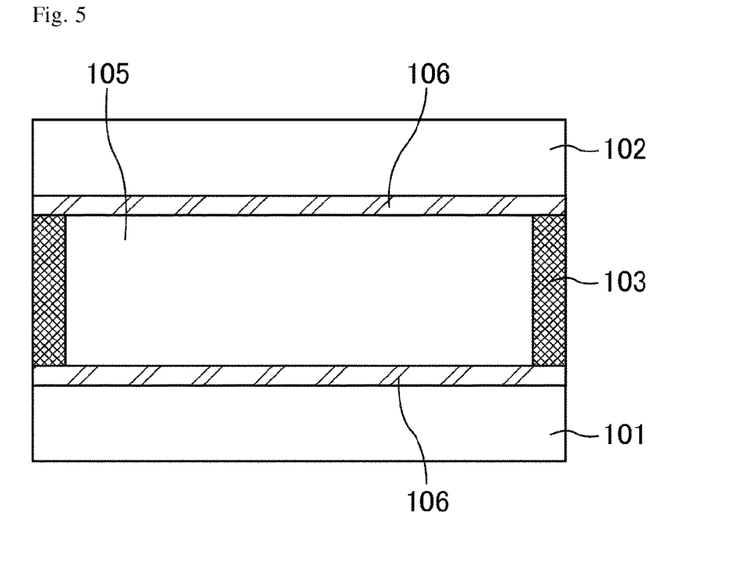
FIG. 5 is a cross-sectional view of a liquid crystal display device including alignment films.

For further information, the structure of a liquid crystal display device with alignment films is described using FIG. 5. In the example shown in FIG. 5, an alignment film 106 made of a polymer material (polyimide) having a backbone containing an imide structure is formed on the surface of each of the array substrate 101 and the color filter substrate 102. An alignment treatment, such as a rubbing treatment or a photo alignment treatment, is carried out on the surfaces of the alignment films 106 such that the alignment films 106 align liquid crystal molecules at a vertical or horizontal pretilt angle (tilt the molecules at an initial tilt angle). Between the array substrate 101 and the color filter substrate 102, a sealing material 103 is attached. The sealing material 103 is located along the periphery of the substrates 101, 102 to seal the liquid crystal layer 105 between the array substrate 1 and the color filter substrate 2. Since the alignment films 106 is formed by applying a polyimide solution or the like before the sealing with the sealing material 103, the alignment films 106 extend below the sealing material 103 as well. Examples of materials for the alignment films 106, besides polyimide, include materials containing polyamic acid, polyamide, polymaleimide, polysiloxane, polysilsesquioxane, polyphosphazene, and a copolymer of at least one of these.

Examples of the monomer that creates a ketyl radical as a result of hydrogen abstraction induced by light radiation used in Embodiment 1 and Embodiment 2 include compounds represented by the formula (1), and more specifically include compounds represented by any of the formulas (2-1) to (2-6) and compounds represented by the formula (3-1) or (3-2).

Any of the compounds represented by the formula (1), which have a structure that creates a ketyl radical as a result of hydrogen abstraction induced by light radiation, is mixed with the liquid crystal material without being combined with other polymerization initiators, and efficiently initiates the polymerization only by light radiation. If the polymerization produces an unnecessary substance that is presumably derived from the polymerization initiator and is likely to be charged, the polymerizable group attached to the substance incorporates the substance into the PSA layer. Accordingly, this case is less prone to image sticking compared to cases in which a polymerization initiator with no polymerizable group represented by any of the formulas (6-1) to (6-7) is used to form PSA layers, for example.

In Embodiment 1 and Embodiment 2, the liquid crystal composition may contain other monomers. For example, a compound represented by the formula (9) can be used, and more specifically, a compound represented by the formula (4) can be used. The compounds represented by the formula (4) provide a PSA layer that ensures stable alignment without alignment films because of their high interaction with liquid crystal molecules. Additionally, since these compounds are highly photostable, and are free of a structure that undergoes photo-Fries rearrangement when exposed to ultraviolet radiation for forming a PSA layer, a decrease in the voltage holding ratio is less likely to occur compared to cases in which a less photostable monomer represented by the formula (8) is used to form a PSA layer, for example.

The following will describes other members of the liquid crystal display devices of Embodiment 1 and Embodiment 2 in detail.

In each of the liquid crystal display devices of Embodiment 1 and Embodiment 2, the array substrate 1, the liquid crystal layer 5 and the color filter substrate 2 are laminated in this order from the back side to the viewer side of the liquid crystal display device. The array substrate 1 is provided with a polarizing plate on the back side thereof. Another polarizing plate is provided on the viewer side of the color filter substrate 2. A retarder may be further provided on these polarizing plates, and these polarizing plates may be circular polarizing plates.

The liquid crystal display devices of Embodiment 1 and Embodiment 2 may be of a transmissive type, a reflective type, or a transflective type. In the case of a transmissive type or a transflective type, the liquid crystal display devices of Embodiment 1 and Embodiment 2 further include a back light unit. The back light unit is disposed on the back side of the array substrate 1 to allow light to pass through the array substrate 1, the liquid crystal layer 5 and the color filter substrate 2 in this order. In the case of a reflective type or a transflective type, the array substrate 1 is provided with a reflector for reflecting external light. Moreover, at least in the region where reflected light is used for display, the polarizing plate of the color filter substrate 2 needs to be a circular polarizer having a $\lambda/4$ retardation plate.

The liquid crystal display devices of Embodiment 1 and Embodiment 2 may have a color filter on array structure in which the array substrate 1 includes color filters.

The liquid crystal display devices of Embodiment 1 and Embodiment 2 may be monochrome displays. In this case, the color filters are not necessary.

The liquid crystal layer 5 is filled with a liquid crystal material which is rendered in a certain alignment while a certain voltage is applied thereto. The alignment of the liquid crystal molecules in the liquid crystal layer 5 is controlled by application of a threshold or higher voltage. The alignment mode of the liquid crystal molecules of Embodiment 1 and Embodiment 2 is not particularly limited, but may be any of, for example, the TN mode, the IPS mode, and the VA mode. For example, the monofunctional acrylate monomer represented by the following formula (12) is suitable for the VA mode, TBA mode, or the like, the initial alignment of which is vertical alignment because of its high capability of controlling the alignment vertically.

The liquid crystal display devices of Embodiment 1 and Embodiment 2 can be analyzed for the monomer components in the PSA layer, the proportional amounts of monomer components in the PSA layer, and the amount of residual monomers in the liquid crystal layer by disassembling the liquid crystal display devices (for example, in the form of mobile phones, monitors, liquid crystal TVs (televisions), or information displays), and performing a chemical analysis technique, such as nuclear magnetic resonance (NMR), Fourier transform infrared spectroscopy (FT-IR), or mass spectrometry (MS).

EXAMPLE 1

The following demonstrates Example 1 in which a liquid crystal cell including the liquid crystal display device of Embodiment 1 was actually produced. First, a pair of substrates with a transparent electrode on the surface thereof was prepared. The substrates were attached without being subjected to any step for forming an alignment film after a sealing material was applied to one of the substrates and beads were applied to the other substrate. Subsequently, a liquid crystal composition containing a liquid crystal material with negative dielectric constant anisotropy, and radical polymerizable monomers was injected between the substrates. The sealing material may be any of heat curable materials, UV curable materials, and UV and heat curable materials.

A combination of a monomer represented by the formula (11) and a monomer represented by the formula (12) was used in the liquid crystal composition. The compound represented by the formula (11) is a benzophenone bifunctional methacrylate monomer, and the compound represented by the formula (12) is a biphenyl monofunctional acrylate monomer.

[Chem. 11]

(11)

[Chem. 12]

(12)

After the liquid crystal composition was injected, the monomers were polymerized by irradiating the substrates with unpolarized UV light (0.33 mW/cm$^2$) for 15 minutes (0.3 J/cm$^2$) in a normal direction relative to the substrates while no voltage was applied. The unpolarized UV light source was a black light lamp (FHF-32BLB, TOSHIBA Lighting & Technology Corporation). The FHF-32BLB is an ultraviolet light source that has a small intensity at 310 nm and a high intensity at 330 nm or a longer wavelength. The electrodes used were flat electrodes without slits.

As shown in the following scheme (13), UV light is emitted to the compound represented by the formula (11) to photoexcite the carbonyl group, and the excited carbonyl group absorbs hydrogen in the system to create a radical.

[Chem. 13]

(13)

The radical reacts with the polymerizable groups of the monomers, thereby growing the polymer chain.

Figure 6:
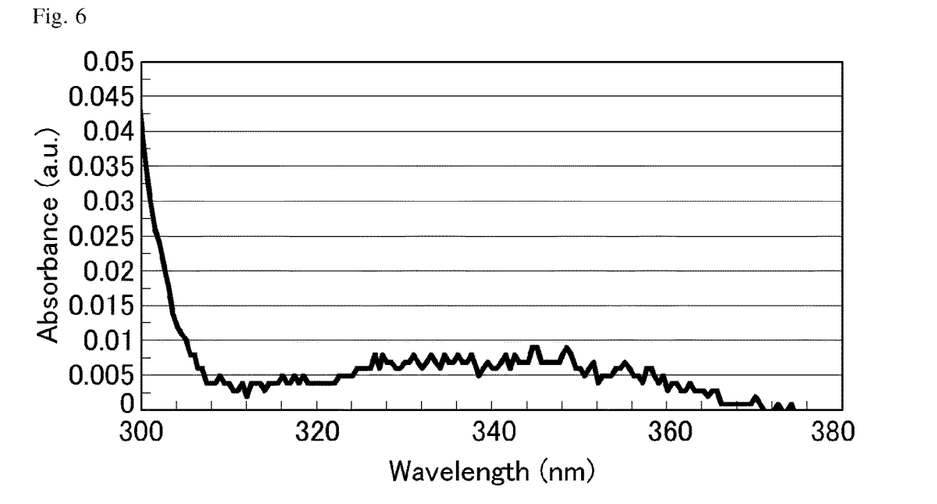
FIG. 6 is an absorption spectrum of the compound represented by the formula (11).

As seen in the absorption spectrum of FIG. 6, the compound represented by the formula (11) absorbs light in a wavelength range including up to approximately 380 nm, and therefore can initiate the polymerization even when light of short wavelengths (e.g. light in a wavelength range of shorter than 330 nm) which may have negative impact on the reliability of liquid crystal is cut.

Evaluation Test 1

In Example 1, four samples were prepared using the benzophenone bifunctional methacrylate monomer represented by the formula (11) in amounts of 0 wt %, 0.01 wt %, 0.05 wt %, 0.15 wt % relative to the total amount of the liquid crystal composition, respectively. The amount of the biphenyl monofunctional acrylate monomer represented by the formula (12) was fixed to 1.0 wt % relative to the total amount of the liquid crystal composition. The following shows the results of evaluation of features.

The completed liquid crystal cells of Example 1 were measured for the voltage holding ratio (VHR). The VHR was determined by checking the charge retention at 70° C. at intervals of 16.61 ms after application of a pulse voltage of 1 V (measuring apparatus: liquid crystal material characteristics measurement system model 6254 from TOYO Corporation). Table 1 shows the alignment, the measured VHR data (%) and the solubility of the compound of the formula (11) in the liquid crystal compositions of the liquid crystal samples of Example 1.

TABLE 1

| Amount of compound of formula (11) (wt %) | Alignment | VHR (%) | Solubility of compound of formula (11) in liquid crystal |
|---|---|---|---|
| 0 | Random alignment | 99.8 | Soluble |
| 0.01 | Incomplete (partially including horizontal alignment) | 98.9 | Soluble |
| 0.05 | Vertical alignment in the entire face | 98.0 | Soluble |
| 0.15 | Vertical alignment in the entire face | 97.1 | Soluble |

FIGS. 7 to 10 are photographs of the liquid crystal cells having been subjected to ultraviolet radiation under crossed nicols. FIGS. 7 to 10 respectively show the liquid crystal cells, the amounts of the polymerization initiator monomer represented by the formula (11) of which were 0 wt %, 0.01 wt %, 0.05 wt %, and 0.15 wt % relative to the total liquid crystal composition amount.

As seen in Table 1, when the amount of the polymerization initiator monomer represented by the formula (11) was 0 wt % relative to the total amount of the liquid crystal composition, the liquid crystal molecules were not aligned vertically; when the amount was 0.01 wt %, the liquid crystal molecules were mostly aligned vertically; when the amount was 0.05 wt % or more, the cell was of the vertical alignment mode without alignment defects. Although there is a trend towards decreasing VHR with increasing amount of the initiator, a VHR of higher than 97% could be achieved with 0.15 wt % of the initiator.

Figure 7:
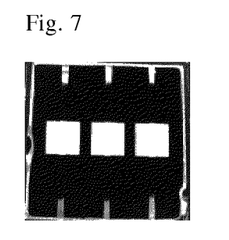
FIG. 7 is a photograph of a liquid crystal cell of Example 1 having been subjected to ultraviolet radiation. This cell was prepared using 0 wt % of the compound represented by the formula (11).
Figure 8:
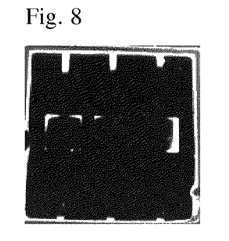
FIG. 8 is a photograph of a liquid crystal cell of Example 1 having been subjected to ultraviolet radiation. This cell was prepared using 0.01 wt % of the compound represented by the formula (11).
Figure 9:
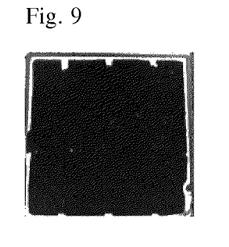
FIG. 9 is a photograph of a liquid crystal cell of Example 1 having been subjected to ultraviolet radiation. This cell was prepared using 0.05 wt % of the compound represented by the formula (11).
Figure 10:
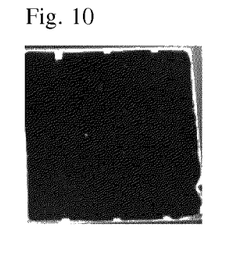
FIG. 10 is a photograph of a liquid crystal cell of Example 1 having been subjected to ultraviolet radiation. This cell was prepared using 0.15 wt % of the compound represented by the formula (11).

The photographs show the following facts. The pixel regions of the liquid crystal cell of FIG. 7 are not black, which means that liquid crystal molecules were not vertically aligned at all. In FIG. 8, the pixel regions of the liquid crystal cell are mostly black, and only in limited parts of the regions, liquid crystal molecules were not vertically aligned. In FIGS. 9 and 10, substantially the whole pixel regions of the liquid crystal cells are black, which means that liquid crystal molecules in the entire face were aligned vertically.

The above results revealed that a combination of a highly photostable monofunctional acrylate monomer that will not undergo Fries rearrangement when exposed to ultraviolet radiation and a benzophenone bifunctional methacrylate monomer that initiates radical polymerization provides good alignment and a high VHR.

EXAMPLE 2

The following demonstrates Example 2 in which a liquid crystal cell including the liquid crystal display device of Embodiment 2 was actually produced. First, a pair of substrates with a transparent electrode on the surface thereof was prepared. The substrates were treated with the silane coupling agent represented by the following formula (14) to form a silane coupling layer without being subjected to any step for forming an alignment film.

[Chem. 14]

$$(CH_3O)_3SiC_3H_6NHC_2H_4NH_2 \quad (14)$$

The substrates were attached after a sealing material was applied to one of the substrates and beads were applied to the other substrate. Subsequently, a liquid crystal composition containing a liquid crystal material with negative dielectric constant anisotropy and radical polymerizable monomers was injected between the substrates. The sealing material may be any of heat curable materials, UV curable materials, and UV and heat curable materials.

Figure 11:
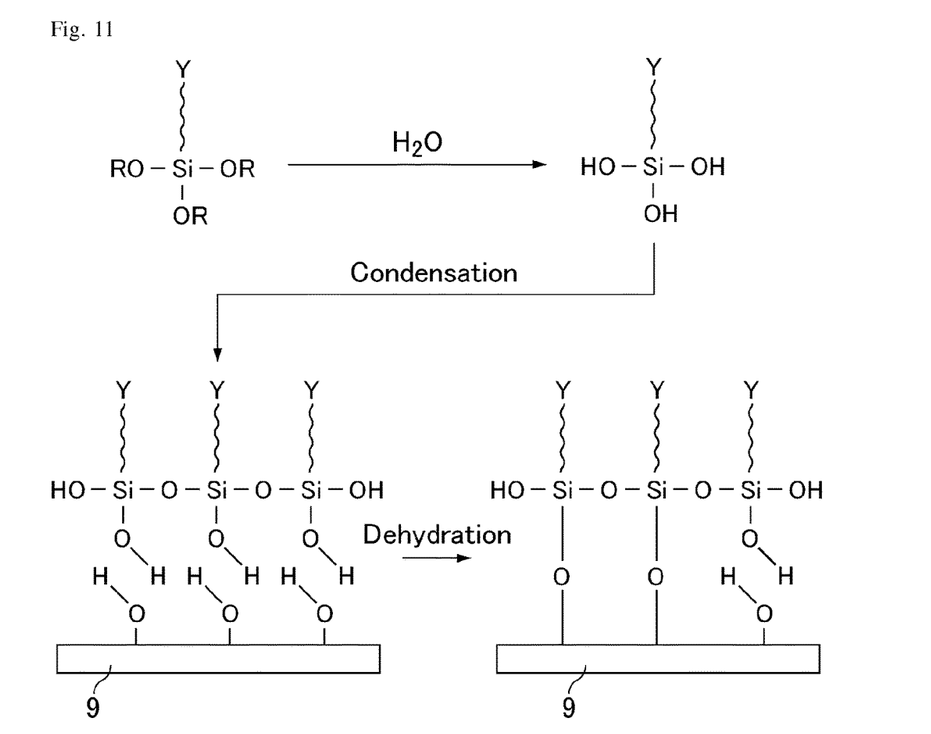
FIG. 11 is a view illustrating the mechanism of how a silane coupling agent reacts on the outermost surface of a substrate.

When the compound represented by the formula (14) is used as a silane coupling agent, and dissolved in water or an organic solvent and then applied to the substrates, the silane coupling agent is hydrolyzed and then dehydrated into a silane coupling compound on the outermost surfaces of the substrates, as shown in FIG. 11. In this example, the hydrogen absorption photopolymerization initiator is excited by light radiation, so that the carbonyl group of the initiator absorbs hydrogen in the space containing the injected liquid crystal composition between the substrates to create a radical and to initiate polymerization of the radical polymerizable monomers. Accordingly, the presence of hydrogen of the functional group of the silane coupling compound in the space containing the injected liquid crystal composition between the substrates more accelerates the polymerization, and this shortens the period of UV radiation for forming a PSA layer.

The liquid crystal composition contained a combination of the monomer represented by the formula (11) and the monomer represented by the formula (12).

After the liquid crystal composition was injected, the monomers were polymerized by irradiating the substrates with unpolarized UV light (0.33 mW/cm²) in a normal direction relative to the substrates without applying a voltage. The unpolarized UV light source and electrodes used were the same as those of Example 1.

Evaluation Test 2

In Example 2, two samples were prepared: a liquid crystal cell with substrates surface-treated with the silane coupling agent; and a liquid crystal cell with substrates not subjected to the treatment with the silane coupling agent. Both of the liquid crystal compositions of the respective liquid crystal cells contained the benzophenone bifunctional methacrylate monomer represented by the formula (11) in an amount of 0.15 wt % relative to the total amount of the liquid crystal composition, and the biphenyl monofunctional acrylate monomer represented by the formula (12) in an amount of 1.0 wt % relative to the total amount of the liquid crystal composition. The following shows the results of evaluation of features.

The completed liquid crystal cells of Example 2 were measured for the voltage holding ratio (VHR) under the same measurement conditions as in Example 1. Table 2 shows the UV radiation periods (min) required for forming a PSA layer, the alignment of the liquid crystal, and the measured VHR data (%) of the samples of Example 2.

TABLE 2

| Surface treatment with silane coupling agent | Radiation period (min) | Alignment | VHR (%) |
|---|---|---|---|
| Not performed | 15 | Vertical alignment in the entire face | 97.1 |
| Performed | 5 | Vertical alignment in the entire face | 98.3 |

As seen in Table 2, a high voltage holding ratio of higher than 98% could be achieved even though the period of UV radiation for forming a PSA layer was shorten by performing the surface treatment with the silane coupling agent on the substrate surfaces.

EXAMPLE 3

The following demonstrates Example 3 in which a liquid crystal cell including the liquid crystal display device of Embodiment 1 was actually produced. First, a pair of substrates with a transparent electrode on the surface thereof was prepared. The substrates were attached without being subjected to any step for forming an alignment film after a sealing material was applied to one of the substrates and beads were applied to the other substrate. Subsequently, a liquid crystal composition containing a liquid crystal material with negative dielectric constant anisotropy, and radical polymerizable monomers was injected between the substrates. The sealing material may be any of heat curable materials, UV curable materials, and UV and heat curable materials.

The liquid crystal composition contained the combination of the monomer represented by the formula (15) and the monomer represented by the formula (12). The compound represented by the formula (15) is a benzyl bifunctional methacrylate monomer.

[Chem. 15]

(15)

After the liquid crystal composition was injected, the monomers were polymerized under the same conditions as in Example 1.

Figure 12:
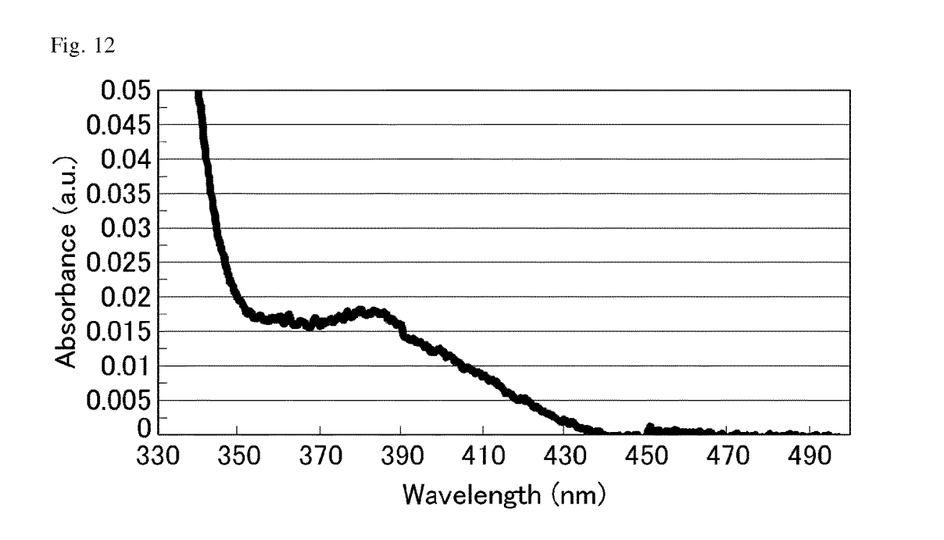
FIG. 12 is an absorption spectrum of the compound represented by the formula (15).

As seen in the absorption spectrum of FIG. 12, the compound represented by the formula (15) absorbs light in a wavelength range including up to approximately 440 nm, and therefore can initiate the polymerization even when light of short wavelengths which may have negative impact on the reliability of liquid crystal is cut.

Evaluation Test 3

In Example 3, four samples were prepared using the benzyl bifunctional methacrylate monomer represented by the formula (15) in amounts of 0 wt %, 0.01 wt %, 0.05 wt %, 0.15 wt % relative to the total amount of the liquid crystal composition, respectively. The amount of the biphenyl monofunctional acrylate monomer represented by the formula (12) was fixed to 1.0 wt % relative to the total amount of the liquid crystal composition. The following shows the results of evaluation of features.

The completed liquid crystal cells of Example 3 were measured for the voltage holding ratio (VHR) under the same measurement conditions as in Example 1. Table 3 shows the alignment, the measured VHR data (%) and the solubility of the compound of the formula (15) in the liquid crystal compositions of the liquid crystal samples of Example 3.

TABLE 3

| Amount of compound of formula (15) (wt %) | Alignment | VHR (%) | Solubility of compound of formula (15) in liquid crystal |
|---|---|---|---|
| 0 | Random alignment | 99.8 | Soluble |
| 0.01 | Incomplete (partially including horizontal alignment) | 98.7 | Soluble |

TABLE 3-continued

| Amount of compound of formula (15) (wt %) | Alignment | VHR (%) | Solubility of compound of formula (15) in liquid crystal |
|---|---|---|---|
| 0.05 | Vertical alignment in the entire face | 98.3 | Soluble |
| 0.15 | Vertical alignment in the entire face | 97.2 | Soluble |

As seen in Table 3, when the amount of the polymerization initiator monomer represented by the formula (15) was 0 wt % relative to the total amount of the liquid crystal composition, the liquid crystal molecules were not aligned vertically; when the amount was 0.01 wt %, the liquid crystal molecules were mostly aligned vertically; when the amount was 0.05 wt % or more, the cell was of the vertical alignment mode without alignment defects. Although there is a trend towards decreasing VHR with increasing amount of the initiator, a VHR of higher than 97% could be achieved with 0.15 wt % of the initiator.

The above results revealed that a combination of a photostable monofunctional monomer that will not undergo Fries rearrangement when exposed to UV light and a benzyl bifunctional monomer that initiates radical polymerization provides good alignment and a high VHR.

EXAMPLE 4

The following demonstrates Example 4 in which a liquid crystal cell including the liquid crystal display device of Embodiment 2 was actually produced. First, a pair of substrates with a transparent electrode on the surface thereof was prepared. The substrates were treated with the silane coupling agent represented by the following formula (14) to form a silane coupling layer without being subjected to any step for forming an alignment film. The substrates were attached after a sealing material was applied to the surface of one of the substrates and beads were applied to the other substrate. Subsequently, a liquid crystal composition containing a liquid crystal material with negative dielectric constant anisotropy and radical polymerizable monomers was injected between the substrates. The sealing material may be any of heat curable materials, UV curable materials, and UV and heat curable materials.

The liquid crystal composition contained a combination of the monomer represented by the formula (15) and the monomer represented by the formula (12).

After the liquid crystal composition was injected, the monomers were polymerized under the same conditions as in Example 2.

Evaluation Test 4

In Example 4, two samples were prepared: a liquid crystal cell with substrates surface-treated with the silane coupling agent; and a liquid crystal cell with substrates not subjected to the treatment with the silane coupling agent. Both of the liquid crystal compositions of the respective liquid crystal cells contained the benzyl bifunctional methacrylate monomer represented by the formula (15) in an amount of 0.15 wt % relative to the total amount of the liquid crystal composition, and the biphenyl monofunctional acrylate monomer represented by the formula (12) in an amount of 1.0 wt % relative to the total amount of the liquid crystal composition. The following shows the results of evaluation of features.

The completed liquid crystal cells of Example 4 were measured for the voltage holding ratio (VHR) under the measurement same conditions as in Example 1. Table 4 shows the UV radiation periods (min) required for forming a PSA layer, the alignment of the liquid crystal, and the measured VHR data (%) of the samples of Example 4.

TABLE 4

| Surface treatment with silane coupling agent | Radiation period (min) | Alignment | VHR (%) |
|---|---|---|---|
| Not performed | 15 | Vertical alignment in the entire face | 97.2 |
| Performed | 5 | Vertical alignment in the entire face | 98.9 |

As seen in Table 4, the surface treatment with the silane coupling agent on the substrate surfaces could shorten the period of UV radiation for forming a PSA layer and ensure a high voltage holding ratio of higher than 980.

REFERENCE SIGNS LIST 1, 11, 101: Array substrate (with transparent electrode formed therein)
2, 12, 102: Color filter substrate (with transparent electrode formed therein)
3, 13, 103: Sealing material
4, 14: Radical polymerizable monomer (compound having a structure that creates a ketyl radical as a result of hydrogen abstraction induced by light radiation)
5, 15, 105: Liquid crystal layer
6, 16: Radical polymerizable monomer (compound having a ring structure and a monofunctional or polyfunctional polymerizable group)
7, 17: PSA layer (polymer layer)
18: Silane coupling layer
9: Transparent electrode
10: Array substrate (with silane coupling layer formed thereon)
20: Color filter substrate (with silane coupling layer formed thereon)
106: Alignment film

The invention claimed is:
1. A liquid crystal display device comprising:
a pair of substrates;
a liquid crystal layer containing a liquid crystal material between the substrates; and
a polymer layer for controlling alignment of liquid crystal molecules on a surface of at least one of the substrates,
the substrates being substantially free of an alignment film in outermost surfaces thereof,
the polymer layer being formed by polymerization of at least two kinds of radical polymerizable monomers in the liquid crystal layer,
at least one of the at least two kinds of radical polymerizable monomers being a compound having a structure that creates a ketyl radical as a result of hydrogen abstraction induced by light radiation and is represented by any of the formulas (2-2), (2-3), (2-4), and (2-6):

(2-2)

(2-3)

(2-4)

(2-6)

wherein each of R1 and R2 is -Sp1-P1;
P1 is acryloyloxy, methacryloyloxy, vinyl, vinyloxy, acryloylamino or methacryloylamino; and
Sp1 is C1 to C6 linear, branched or cyclic alkylene or alkyleneoxy, or a direct bond; and
another of the at least two kinds of radical polymerizable monomers is represented by the following formula (12):

(12)

wherein the at least one of the substrates includes a silane coupling layer on the outermost surface thereof, and the silane coupling layer is directly under and in contact with the polymer layer.
2. The liquid crystal display device according to claim 1, wherein the silane coupling layer comprises a silane coupling compound having at least one functional group selected from the group consisting of vinyl, epoxy, amino, methacryl, acryl, mercapto, and isocyanato.
3. The liquid crystal display device according to claim 1, wherein the liquid crystal material has negative dielectric constant anisotropy.
4. A method for producing a liquid crystal display device, comprising the steps of:
disposing a liquid crystal composition containing a liquid crystal material and at least two kinds of radical polymerizable monomers between a pair of substrates that are substantially free of an alignment film in outermost surfaces thereof; and
polymerizing the radical polymerizable monomers by irradiating the liquid crystal composition with light, thereby forming a polymer layer for controlling alignment of liquid crystal molecules on the surface of at least one of the substrates, at least one of the at least two kinds of radical polymerizable monomers being a compound having a structure that creates a ketyl radical as a result of hydrogen abstraction induced by the light radiation and is represented by any of the formulas (2-2), (2-3), (2-4), and (2-6):

wherein each of R1 and R2 is -Sp1-P1;
P1 is acryloyloxy, methacryloyloxy, vinyl, vinyloxy, acryloylamino or methacryloylamino; and Sp1 is C1 to C6 linear, branched or cyclic alkylene or alkyleneoxy, or a direct bond; and another of the at least two kinds of radical polymerizable monomers is represented by the following formula (12):

and further, forming a silane coupling layer on the outermost surface of the at least one of the substrates, before the step of disposing the liquid crystal composition between the substrates, such that the silane coupling layer is directly under and in contact with the polymer layer.

5. The method for producing a liquid crystal display device according to claim 4, wherein the silane coupling layer comprises a silane coupling compound having at least one functional group selected from the group consisting of vinyl, epoxy, amino, methacryl, acryl, mercapto, and isocyanato.

6. The method for producing a liquid crystal display device according to claim 4, wherein the liquid crystal material has negative dielectric constant anisotropy.

* * * * *